(12) United States Patent
Wang

(10) Patent No.: US 11,375,410 B2
(45) Date of Patent: Jun. 28, 2022

(54) METHOD AND APPARATUS FOR OBTAINING CONFIGURATION INFORMATION, DEVICE, STORAGE MEDIUM, AND SYSTEM

(71) Applicant: Tencent Technology (Shenzhen) Company Limited, Shenzhen (CN)

(72) Inventor: Tao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 49 days.

(21) Appl. No.: 17/062,428

(22) Filed: Oct. 2, 2020

(65) Prior Publication Data

US 2021/0022045 A1 Jan. 21, 2021

Related U.S. Application Data

(63) Continuation of application No. PCT/CN2019/099806, filed on Aug. 8, 2019.

(30) Foreign Application Priority Data

Sep. 14, 2018 (CN) .......................... 201811076529.6

(51) Int. Cl.
*H04W 28/24* (2009.01)
*H04W 76/27* (2018.01)
(Continued)

(52) U.S. Cl.
CPC ........... *H04W 28/24* (2013.01); *H04W 8/183* (2013.01); *H04W 24/02* (2013.01); *H04W 76/27* (2018.02); *H04W 84/042* (2013.01)

(58) Field of Classification Search
CPC . H04W 74/002; H04W 74/004; H04W 48/10; H04W 48/14
See application file for complete search history.

(56) References Cited

U.S. PATENT DOCUMENTS

2017/0303189 A1  10/2017  Hampel et al.
2021/0045060 A1*  2/2021  Sui ................... H04W 72/0406
(Continued)

FOREIGN PATENT DOCUMENTS

CN        104822160 A      8/2015
CN        105144789 A     12/2015
(Continued)

OTHER PUBLICATIONS

Tencent Technology, ISR, PCT/CN2019/099806, dated Oct. 30, 2019, 2 pgs.

(Continued)

*Primary Examiner* — Kevin Kim
(74) *Attorney, Agent, or Firm* — Morgan, Lewis & Bockius LLP

(57) ABSTRACT

Embodiments of this application disclose a method and apparatus for obtaining configuration information performed at a terminal. The terminal obtains configuration information of a 5G local area network (LAN), the configuration information including an information item for assisting the terminal in making an access decision and at least one of the following information items: a first information item, for indicating whether the 5G LAN supports maintenance of session continuity with a public land mobile network (PLMN); a second information item, for indicating an identifier of the 5G LAN; and a third information item, for indicating a service-level agreement (SLA) of the 5G LAN. Next the terminal determines whether to access the 5G LAN according to the configuration information.

16 Claims, 7 Drawing Sheets

(51) Int. Cl.
*H04W 8/18* (2009.01)
*H04W 24/02* (2009.01)
*H04W 84/04* (2009.01)

(56) References Cited

U.S. PATENT DOCUMENTS

| | | | | |
|---|---|---|---|---|
| 2021/0112127 A1* | 4/2021 | Zhu | ................... | H04L 12/4645 |
| 2021/0176801 A1* | 6/2021 | Yao | ................... | H04L 41/0893 |

FOREIGN PATENT DOCUMENTS

| | | |
|---|---|---|
| CN | 105430687 A | 3/2016 |
| CN | 106134245 A | 11/2016 |
| CN | 107155187 A | 9/2017 |
| CN | 108366365 A | 8/2018 |
| CN | 109076329 A | 12/2018 |
| CN | 109168171 A | 1/2019 |
| EP | 3836514 A1 | 6/2021 |
| WO | WO 2010127683 A1 | 11/2010 |
| WO | WO 2017147271 A1 | 8/2017 |

OTHER PUBLICATIONS

Tencent Technology, WO, PCT/CN2019/099806, dated Oct. 30, 2019, 6 pgs.
Tencent Technology, IPRP, PCT/CN2019/099806, dated Mar. 9, 2021, 7 pgs.
3GPP TR 23.734, "3rd Generation Partnership Project; Technical Specification Group Services and System Aspects; Study on 5GS Enhanced Support of Vertical and LAN Services", (Release 16), Technical Report, Mobile Competence Centre, Sophia-Antipolis Cedex, France, No. V0.2.0, Sep. 10, 2018, XP051486987, 37 pgs.
Extended European Search Report, EP19861117,0, dated Jul. 19, 2021, 16 pgs.
Huawei et al., "The Mechanism for the 5GS to Configure Service Restriction for A Particular 5GLAN Group", 3GPP; S2-188298-V5. 4, 3rd Generation Patnership Project, Mobile Competence Centre, Antipolis, France, Aug. 14, 2018, XP051502953, Retrieved from the Internet: http://www.3gpp.org/ftp/tsg%5Fsa/WG2%5FArch/TSGS2%5F128BIS%5FSophia%5FAntipolis/Docs/S2%2D188298%2Ezip.

* cited by examiner

METHOD AND APPARATUS FOR OBTAINING CONFIGURATION INFORMATION, DEVICE, STORAGE MEDIUM, AND SYSTEM

CROSS-REFERENCE TO RELATED APPLICATIONS

This application is a continuation application of PCT Patent Application No. PCT/CN2019/099806, entitled "CONFIGURATION INFORMATION ACQUISITION METHOD, APPARATUS AND DEVICE, AND STORAGE MEDIUM AND SYSTEM" filed on Aug. 8, 2019, which claims priority to Chinese Patent Application No. 201811076529.6, entitled "METHOD AND APPARATUS FOR OBTAINING CONFIGURATION INFORMATION, DEVICE, AND SYSTEM" filed on Sep. 14, 2018, all of which are incorporated by reference in their entirety.

FIELD OF THE TECHNOLOGY

Embodiments of this application relate to the field of communication technologies, and in particular, to a method and apparatus for obtaining configuration information, a device, a storage medium, and a system.

BACKGROUND OF THE DISCLOSURE

The 5th generation (5G) mobile communication technology system is also referred to as the new radio (NR) system. In the 5G system, a 5G local area network (LAN) is a LAN created by using the 5G NR. Reliable and efficient transmission in the industrial Internet can be implemented, and services in the LAN can be maintained isolated from a public network by using the 5G LAN.

In the related art, after a terminal accesses a 5G LAN, a current service of the terminal may be performed by using the 5G LAN. However, when the 5G LAN does not meet a service requirement, for example, the 5G LAN does not support session continuity but a current service of the terminal requires session continuity, the terminal needs to disconnect from the 5G LAN, select another 5G LAN to establish a connection, and continue to make a check with a network element of a core network, resulting in relatively low efficiency with which the terminal accesses a 5G LAN.

SUMMARY

A method and apparatus for obtaining configuration information, a device, and a system are provided according to embodiments provided in this application.

According to one aspect, a method for obtaining configuration information is performed by a terminal, the method including:
obtaining, by the terminal, configuration information of a 5G local area network (LAN), the configuration information including an information item for assisting the terminal in making an access decision and at least one of the following information items: a first information item, for indicating whether the 5G LAN supports maintenance of session continuity with a public land mobile network (PLMN); a second information item, for indicating an identifier of the 5G LAN; and a third information item, for indicating a service-level agreement (SLA) of the 5G LAN; and
determining, by the terminal, whether to access the 5G LAN according to the configuration information.

According to another aspect, a method for obtaining configuration information is performed by an access network device, the method including:
transmitting, by the access network device, configuration information of a 5G local area network (LAN) to a terminal, the configuration information including an information item for assisting the terminal in making an access decision.

According to another aspect, an apparatus for obtaining configuration information is provided, including:
a receiving module, configured to obtain configuration information of a 5G local area network (LAN), the configuration information including an information item for assisting the terminal in making an access decision; and a processing module, configured to determine whether to access the 5G LAN according to the configuration information.

According to another aspect, an apparatus for obtaining configuration information is provided, including:
a transmitting module, configured to transmit configuration information of a 5G local area network (LAN) from an access network device to a terminal, the configuration information including an information item for assisting the terminal in making an access decision.

According to another aspect, a terminal is provided, including:
a processor;
a transceiver connected to the processor; and
a memory, configured to store processor-executable instructions,
the processor being configured to perform the method for obtaining configuration information according to the embodiments of this application.

According to another aspect, an access network device is provided, including: a processor; a transmitter and a receiver connected to the processor; and a memory, configured to store processor-executable instructions, the processor being configured to perform the method for obtaining configuration information according to the embodiments of this application.

According to another aspect, one or more non-volatile storage media storing computer-readable instructions are provided, the computer-readable instructions, when executed by one or more processors, causing the one or more processors to perform the method for obtaining configuration information according to the embodiments of this application.

According to another aspect, a communication system is provided, including: a terminal and an access network device,
the terminal including the apparatus for obtaining configuration information according to the embodiments of this application; and
the access network device including the apparatus for obtaining configuration information according to the embodiments of this application.

According to another aspect, a communication system is provided, including: a terminal and an access network device,
the terminal including the terminal according to the embodiments of this application; and
the access network device including the device according to the embodiments of this application.

Details of one or more embodiments of this application are provided in accompanying drawings and description below. Other features, objectives, and advantages of this application become apparent from the specification, the accompanying drawings, and the claims.

BRIEF DESCRIPTION OF THE DRAWINGS

To describe the technical solutions of embodiments of this application more clearly, the following briefly describes accompanying drawings required for describing the embodiments. Apparently, the accompanying drawings in the following description show only some embodiments of this application, and a person of ordinary skill in the art may still derive other drawings from the accompanying drawings without creative efforts.

DESCRIPTION OF EMBODIMENTS

To make the objectives, technical solutions, and advantages of this application clearer, the following further describes the implementations of this application in detail with reference to the accompanying drawings.

Figure 1:
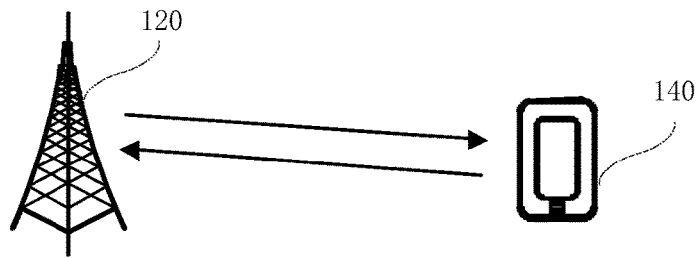
FIG. 1 is a schematic structural diagram of a mobile communication system according to an exemplary embodiment of this application.

FIG. 1 is a schematic structural diagram of a mobile communication system according to an embodiment of this application. The mobile communication system may be a 5G system, also referred to as an NR system. The mobile communication system includes an access network device 120 and a terminal 140.

The access network device 120 may be a base station. For example, the base station may be a next-generation Node B (gNB) using a centralized or distributed architecture in the 5G system. When using the centralized or distributed architecture, the access network device 120 generally includes a central unit (CU) and at least two distributed units (DU). The CU and the DU are provided with a protocol stack of a Packet Data Convergence Protocol (PDCP) layer, a Radio Link Control (RLC) layer, a physical (PHY) layer, and a Media Access Control (MAC) layer. An arrangement of each protocol stack in the CU and the DU is determined according to a logical function division method of the CU and the DU. For example, when a 1A splitting method is used, the PDCP, the RLC, the MAC, and the PHY are all distributed in the DU. When a 3C splitting method is used, the PDCP is located in the CU, and the RLC, the MAC, and the PHY are located in the DU. When an RLC internal splitting method is used, the MAC and the PHY are located in the DU, and the PDCP and the RLC are located in the CU. A specific implementation of the access network device 120 is not limited in this embodiment of this application.

The access network device 120 and the terminal 140 establish a wireless connection through a wireless air interface. Optionally, the wireless air interface is a wireless air interface based on a 5G standard. For example, the wireless air interface is NR. Alternatively, the wireless air interface may be a wireless air interface based on a next-generation-of-5G mobile communication network technology standard.

The terminal 140 may be also referred to as user equipment (UE), which may be a device that provides at least one of voice or data connectivity to a user. The terminal may communicate with one or more core networks through a radio access network (RAN). The terminal 140 may be a mobile terminal, such as a mobile phone (or referred to as a "cellular" phone) and a computer with a mobile terminal, such as, may be a portable, pocket-sized, handheld, computer built-in, or in-vehicle mobile apparatus, for example, a subscriber unit, a subscriber station, a mobile station, a mobile, a remote station, an access point, a remote terminal, an access terminal, a user terminal, a user agent, a user device or UE.

In the mobile communication system shown in FIG. 1, there may be a plurality of access network devices 120 or/and a plurality of terminals 140. Description is made by using an example in which one access network device 120 and one terminal 140 are shown in FIG. 1, but this is not limited in this embodiment.

The 5G LAN in this embodiment of this application is a LAN created by using the 5G NR.

Figure 2:
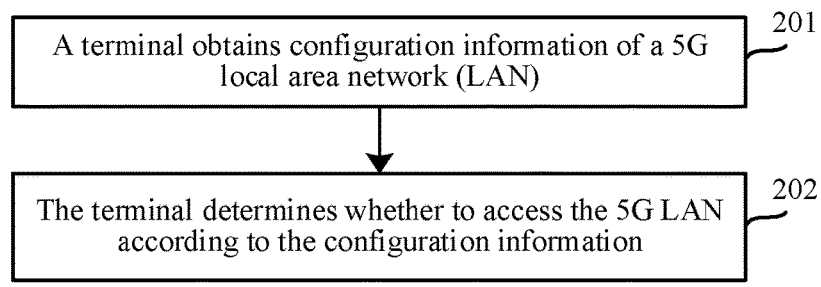
FIG. 2 is a flowchart of a method for obtaining configuration information according to an exemplary embodiment of this application.

FIG. 2 is a schematic diagram of a method for obtaining configuration information according to an exemplary embodiment of this application. The method may be performed by the mobile communication system shown in FIG. 1. As shown in FIG. 2, the method includes the following steps.

Step 201: A terminal obtains configuration information of a 5G LAN.

Optionally, the configuration information includes an information item for assisting the terminal in making an access decision. Optionally, the access decision is for determining whether the terminal accesses the 5G LAN. Optionally, the access decision is for determining, according to a matching result of the configuration information of the 5G LAN and a service attribute requirement of the terminal, whether to access the 5G LAN.

Optionally, the configuration information includes at least one of the following information items: a first information item, for indicating whether the 5G LAN supports maintenance of session continuity with a public land mobile network (PLMN); a second information item, for indicating an identifier of the 5G LAN; and a third information item, for indicating a service-level agreement (SLA) of the 5G LAN.

Optionally, in this embodiment, description is made by using an example in which the configuration information includes at least one of the first information item, the second information item, and the third information item. In an actual operation, the configuration information may further include another information item. The types of the information items are not limited in this embodiment of this application.

Optionally, the terminal obtains the 5G LAN in at least one of the following manners.

In a first manner: the terminal receives the configuration information transmitted by an access network device in a Radio Resource Control (RRC) signaling manner.

The RRC layer signaling is a signaling provided by a third layer of an access system. The access system of the access network device is divided into three layers. A first layer is a PHY layer. A second layer is an RLC sublayer, a MAC sublayer, and a PDCP sublayer. The third layer is the RRC layer. The RRC signaling manner is a signaling manner completed through the RRC layer.

Optionally, the RRC signaling manner includes a system information (SI) broadcast manner and an RRC dedicated signaling manner.

Optionally, after obtaining the configuration information from a core network first, the access network device transmits the configuration information to the terminal in the RRC signaling manner.

In a second manner, the terminal receives a non-access stratum (NAS) signaling transmitted by the access network device, the NAS signaling including the configuration information.

The NAS is a functional layer, between the core network and the UE, configured to support signaling and data transmission between the core network and the UE.

Optionally, when the terminal receives the NAS signaling transmitted by the access network device, the NAS signaling may be, after the terminal transmits an attach request to a first network element in the core network by using the access network device, a first NAS signaling with which the first network element responds to the terminal by using the access network device. Alternatively, the NAS signaling may be, after the terminal transmits a tracking area update (TAU) request to a second network element in the core network by using the access network device because a position of the terminal in a cell changes, a second NAS signaling with which the second network element responds by using the access network device. This is not limited in this embodiment of this application.

In a third manner, the terminal obtains the configuration information from subscription information.

Optionally, the subscription information may be stored in a third network element of the core network, in the terminal, or in a subscriber identity module (SIM) card of the terminal.

The first network element, the second network element, and the third network element may be the same network element in the core network, or different network elements in the core network. This is not limited in this embodiment of this application.

Step 202: The terminal determines, whether to access the 5G LAN according to the configuration information.

Optionally, the terminal matches the configuration information with a configuration requirement of a current service, and determines, according to the matching result of the configuration information and the configuration requirement, whether the terminal accesses the 5G LAN.

Optionally, the configuration information includes an information item for making an access decision.

The configuration requirement further includes a current information item requirement corresponding to the information item. The terminal matches each information item with an information item requirement, and determines, according to a matching result of the information item and the information item requirement, whether to access the 5G LAN.

Optionally, each information item corresponds to an information item requirement. Whether to access the 5G LAN is determined according to a matching result of all the information items and the information item requirements.

For example, if the information item included in the configuration information is a first information item, the terminal matches session continuity of the 5G LAN with a session continuity requirement of the current service, and determines, according to a matching result of the session continuity and the session continuity requirement, whether to access the 5G LAN. For example, if the 5G LAN does not support the session continuity, but the session continuity requirement of the current service of the terminal is that the 5G LAN supports the session continuity, the terminal does not access the 5G LAN.

For example, if the information items included in the configuration information are the first information item and the second information item, an information item requirement corresponding to the first information item is the session continuity requirement, and an information item requirement corresponding to the second information item is an SLA requirement, the terminal matches the session continuity of the 5G LAN with the session continuity requirement, and matches the SLA of the 5G LAN with the SLA requirement. When the session continuity of the 5G LAN meets the session continuity requirement or/and the SLA of the 5G LAN meets the SLA requirement, the terminal accesses the 5G LAN.

For example, if one information item is included in the configuration information, the terminal accesses the 5G LAN when the information item meets a corresponding information item requirement. If the configuration information includes two information items, the terminal may access the 5G LAN when one of the information items meets a corresponding information item requirement, or the terminal may access the 5G LAN when the two information items both meet corresponding information item requirements. If the configuration information includes three information items, the terminal may access the 5G LAN when one of the information items meets a corresponding information item requirement, or the terminal may access the 5G LAN when two of the information items meet corresponding information item requirements, or the terminal may access the 5G LAN when all the three information items meet corresponding information item requirements. This is not limited in this embodiment of this application.

Optionally, the configuration information in this application further includes a PLMN related to the 5G LAN. The first information item is further for indicating whether the 5G LAN and the associated PLMN support session continuity.

When a to-be-camped-on cell of the terminal supports n 5G LANs, the configuration information includes a configuration information list. The configuration information list includes n pieces of data. An $i^{th}$ piece of data includes configuration information of an $i^{th}$ 5G LAN, n being a positive integer, $1 \leq i \leq n$.

In summary, in the method for obtaining configuration information provided in this embodiment, before accessing the 5G LAN, the terminal obtains the configuration information of the 5G LAN first. The configuration information includes an information item for assisting the terminal in making an access decision. The terminal determines, according to the configuration information, whether to access the 5G LAN. That is, before accessing the 5G LAN, the terminal obtains the configuration information first, and determines, according to the configuration information, whether to access the 5G LAN, to avoid a problem that the terminal, after accessing the 5G LAN, needs to disconnect and reconnect to a new 5G LAN because the 5G LAN does not meet the configuration requirement (for example: the 5G LAN does not support session continuity), reduce a probability that the terminal reconnects to the new 5G LAN, avoid a waste of network resources when the terminal reconnects to the new 5G LAN, and improve the access efficiency with which the terminal accesses the 5G LAN.

Figure 3:
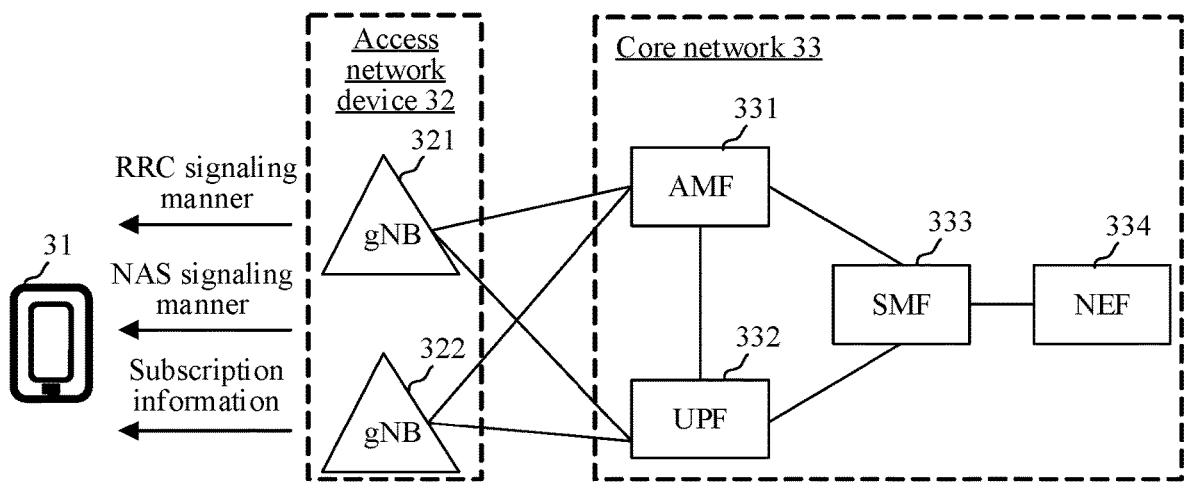
FIG. 3 is a schematic structural diagram of a mobile communication system according to another exemplary embodiment of this application.

FIG. 3 is a schematic diagram of a mobile communication system according to an exemplary embodiment of this application. As shown in FIG. 3, the mobile communication system includes a terminal 31, an access network device 32 and a core network 33. Description is made by using an example in which the access network device 32 includes a gNB 321 and a gNB 322. For example, a LAN supported by the gNB 321 is a 5G LAN1, and a service attribute of the 5G LAN1 is an attribute a; and a LAN supported by the gNB 322 is a 5G LAN2, and a service attribute of the 5G LAN2 is an attribute b. The access network device 32 obtains the configuration information of the 5G LAN from a network element of the core network 33. The configuration information includes the service attribute of the 5G LAN. Optionally, network elements included in the core network 33 include at least an access and mobility function (AMF) 331, a user plane function (UPF) 332, a session management function (SMF) 333, and a network exposure function (NEF) 334 shown in FIG. 3. Optionally, for example, in FIG. 3, the AMF 331 is communicatively connected to the gNB 321 and the gNB 322, and the UPF 332 is communicatively connected to the gNB 321 and the gNB 322. In an actual operation, the SMF 333 and the NEF 334 may be both communicatively connected to the gNBs 321 and 322. A communicative connection manner between the network element and the gNB is not limited in this embodiment of this application.

For example, if a configuration requirement of a current service of the terminal 31 is that a service attribute is the attribute a, the terminal determines that the 5G LAN1 meets the configuration requirement, and accesses the 5G LAN1 after the gNB 321 and the gNB 322 transmits the service attributes of the 5G LAN1 and the 5G LAN2 to the terminal 31 in the RRC signaling manner, the NAS signaling manner, or the subscription information manner.

Methods for obtaining configuration information in the embodiments of this application are respectively described in combination with the RRC signaling manner, the NAS signaling manner, and the subscription information manner.

Figure 6:
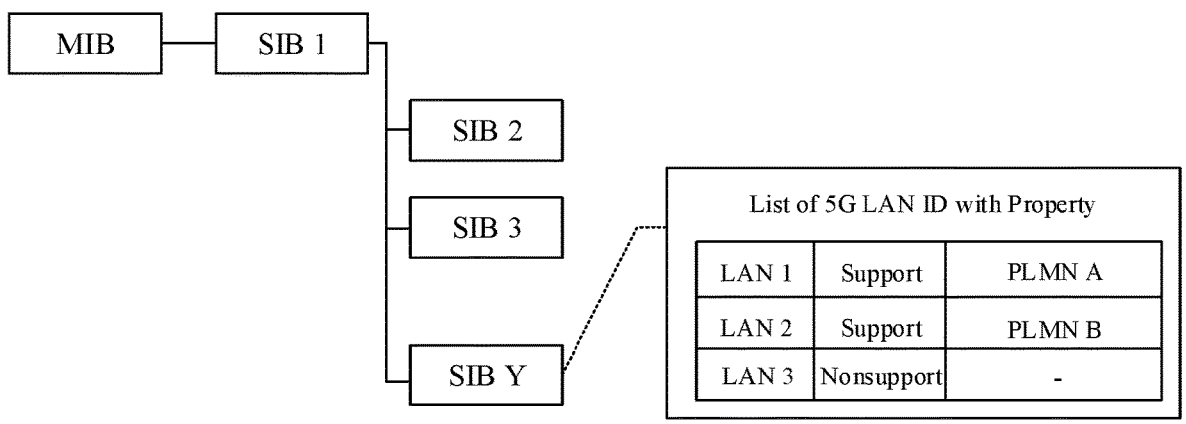
FIG. 6 is a schematic diagram of content of a SIB Y according to an exemplary embodiment based on FIG. 4 and FIG. 5.
Figure 7:
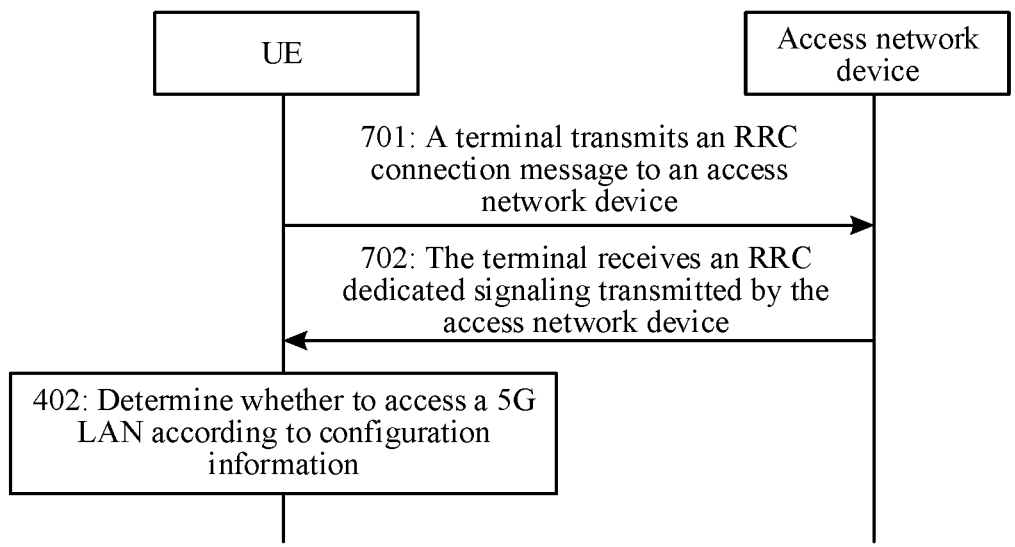
FIG. 7 is a flowchart of a method for obtaining configuration information according to another exemplary embodiment of this application.
Figure 8:
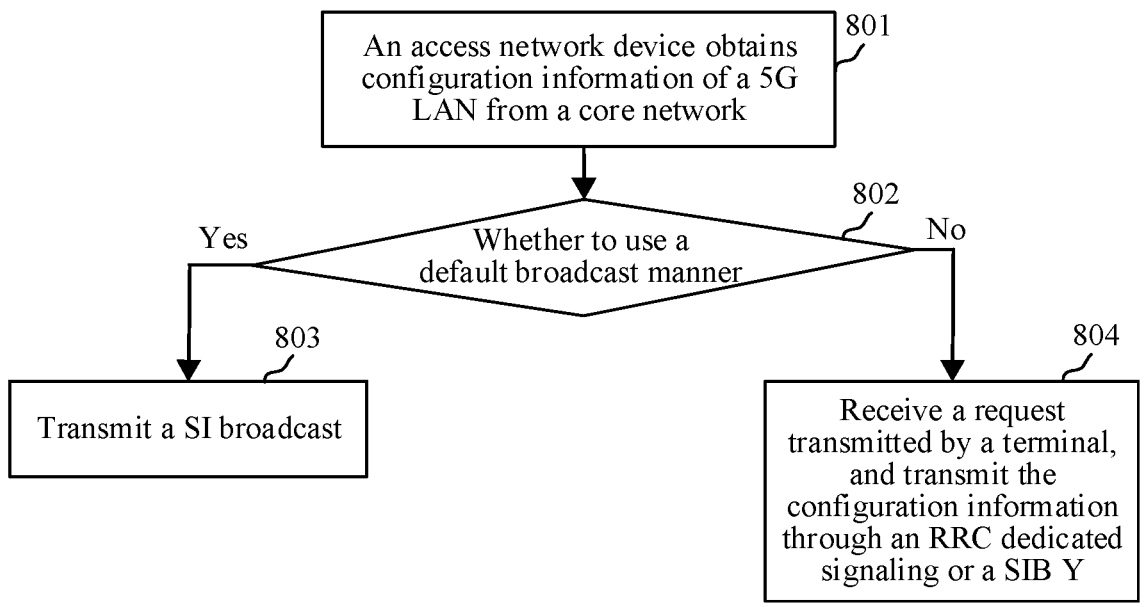
FIG. 8 is a flowchart of a method for obtaining configuration information according to another exemplary embodiment of this application.
Figure 9:
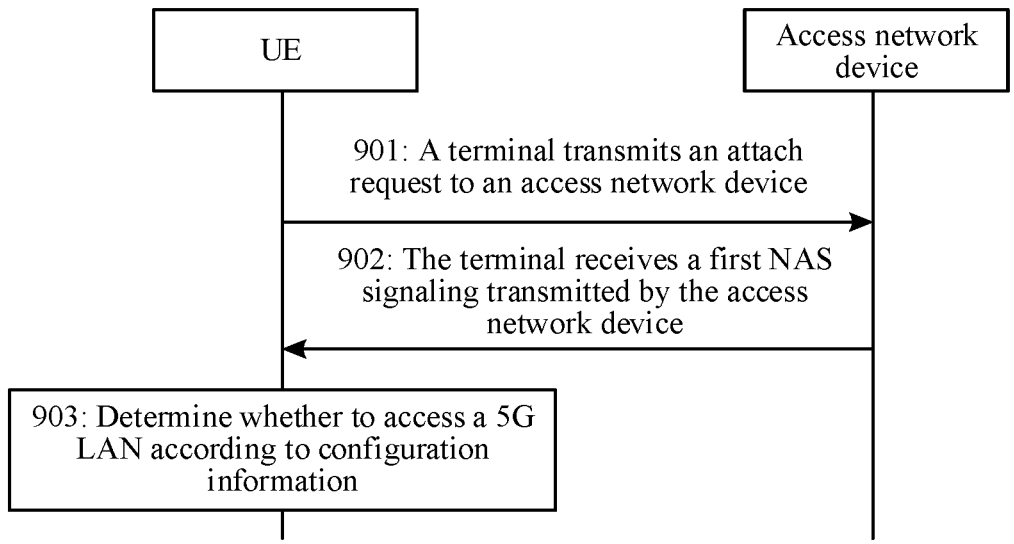
FIG. 9 is a flowchart of a method for obtaining configuration information according to another exemplary embodiment of this application.
Figure 10:
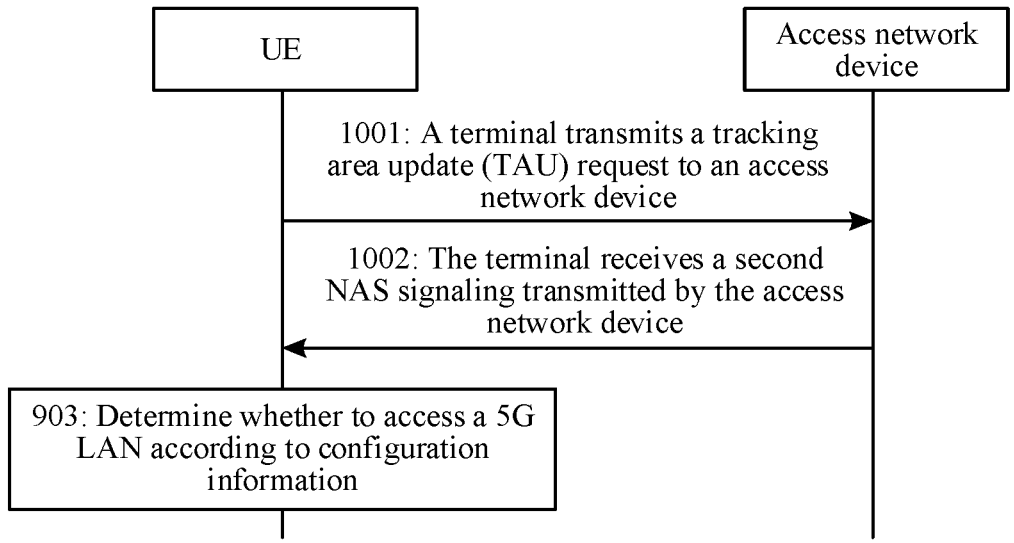
FIG. 10 is a flowchart of a method for obtaining configuration information according to another exemplary embodiment of this application.

FIG. 4 to FIG. 7 show a method for obtaining configuration information corresponding to the RRC signaling manner. FIG. 8 and FIG. 9 show a method for obtaining configuration information corresponding to the NAS signaling manner. FIG. 10 shows a method for obtaining configuration information corresponding to the subscription information manner.

Figure 4:
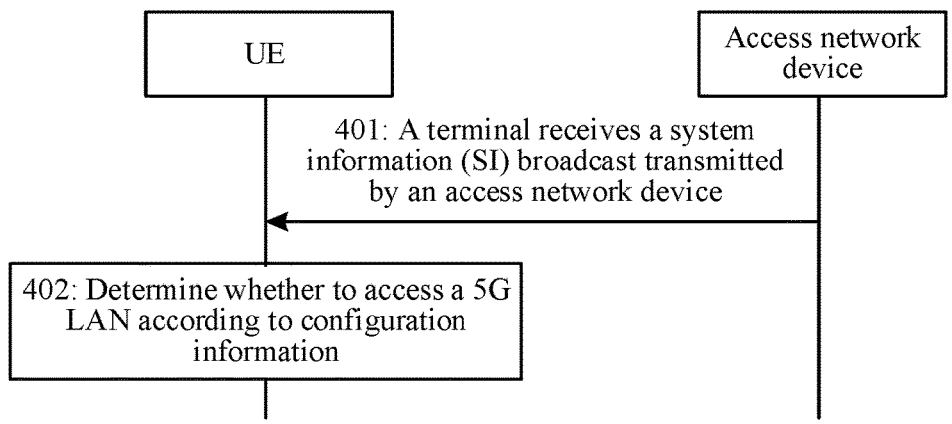
FIG. 4 is a flowchart of a method for obtaining configuration information according to another exemplary embodiment of this application.
Figure 5:
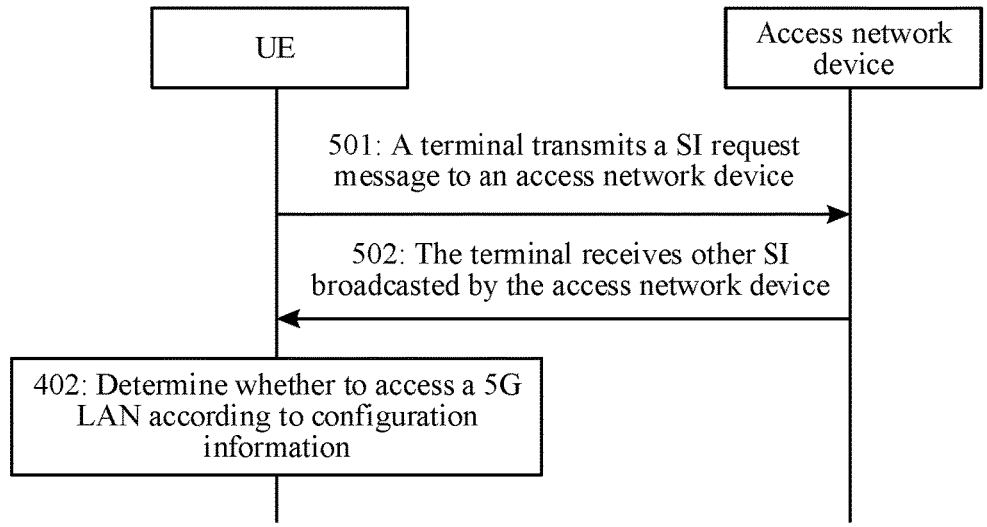
FIG. 5 is a flowchart of a method for obtaining configuration information according to another exemplary embodiment of this application.

First, description is made for the RRC signaling manner. FIG. 4 shows a manner of transmitting a SI broadcast by default by an access network device. FIG. 5 shows a manner of transmitting other SI by an access network device according to a received SI request message. FIG. 7 shows a manner of transmitting an RRC dedicated signaling to a terminal by an access network device according to a received RRC connection message.

FIG. 4 is a flowchart of a method for obtaining configuration information according to an exemplary embodiment of this application. Description is made by using an example in which the method is performed in an RRC signaling manner. The method may be performed by the mobile communication system shown in FIG. 1. As shown in FIG. 4, the method includes the following steps.

Step 401: A terminal receives a SI broadcast transmitted by an access network device.

Optionally, the SI broadcast includes configuration information of a 5G LAN, the configuration information including an information item for assisting the terminal in making an access decision.

Optionally, the SI broadcast is a broadcast transmitted by the access network device by default. That is, the access network device may transmit the SI broadcast without receiving a SI request message transmitted by the terminal.

Optionally, the access network device may transmit the SI broadcast once every preset duration.

In the 5G technologies, system information is classified into minimum SI and other SI. The minimum SI includes a master information block (MIB) and a SI block (SIB) 1. The access network device is always broadcasting the minimum SI. The other SI includes all other remaining SIBs. The access network device may optionally broadcast one or more SIBs in the other SI.

Optionally, the SI broadcast may be broadcasted in the form of other SI. The other SI includes a SIB Y. The SIB Y includes the configuration information.

Optionally, when a volume of data of the configuration information is small, the configuration information may alternatively be broadcasted in the SIB 1. For example, when the volume of data of the configuration information is less than a preset volume of data, the terminal receives the minimum SI broadcasted by the access network device, the minimum SI including the configuration information.

Optionally, the access network device obtains the configuration information of the 5G LAN from a core network first, carries the configuration information in the SI broadcast, and broadcasts the SI broadcast.

Step 402: The terminal determines whether to access the 5G LAN according to the configuration information.

Optionally, the terminal matches the configuration information with a configuration requirement of a current service, and determines, according to the matching result of the configuration information and the configuration requirement, whether the terminal accesses the 5G LAN.

Optionally, the configuration information includes an information item for making an access decision. The configuration requirement further includes a current information item requirement corresponding to the information item. The terminal matches each information item with an information item requirement, and determines, according to a matching result of the information item and the information item requirement, whether to access the 5G LAN. Optionally, each information item corresponds to an information item requirement. Whether to access the 5G LAN is determined according to a matching result of all the information items and the information item requirements.

Optionally, the specific process in which the terminal determines whether to access the 5G LAN is described in detail in step 202. For the specific process, reference is made to the content in step 202. Details are not described herein again.

In summary, in the method for obtaining configuration information provided in this embodiment, before accessing the 5G LAN, the terminal obtains the configuration information of the 5G LAN first. The configuration information includes an information item for assisting the terminal in making an access decision. The terminal determines, according to the configuration information, whether to access the 5G LAN. That is, before accessing the 5G LAN, the terminal obtains the configuration information first, and determines, according to the configuration information, whether to access the 5G LAN, to avoid a problem that the terminal, after accessing the 5G LAN, needs to disconnect and reconnect to a new 5G LAN because the 5G LAN does not meet the configuration requirement (for example: the 5G LAN does not support session continuity), reduce a probability that the terminal reconnects to the new 5G LAN, avoid a waste of network resources when the terminal reconnects to the new 5G LAN, and improve the access efficiency with which the terminal accesses the 5G LAN.

In the method provided in this embodiment, before the terminal accesses the 5G LAN, the access network device first transmits the configuration information to the terminal through the SI broadcast. The configuration information includes an information item for assisting the terminal in making an access decision. The terminal determines, according to the configuration information, whether to access the 5G LAN, to avoid a problem that the terminal, after accessing the 5G LAN, needs to disconnect and reconnect to a new 5G LAN because the 5G LAN does not meet the configuration requirement (for example: the 5G LAN does not support session continuity), reduce a probability that the terminal reconnects to the new 5G LAN, avoid a waste of network resources when the terminal reconnects to the new 5G LAN, and improve the access efficiency with which the terminal accesses the 5G LAN.

FIG. 5 is a flowchart of a method for obtaining configuration information according to another exemplary embodiment of this application. Description is made by using an example in which the method is performed in another RRC signaling manner. Based on the embodiment shown in FIG. 4, step 401 may be further implemented as step 501 and step 502 shown in FIG. 5 instead. The method includes the following steps:

Step 501: A terminal transmits a SI request message to an access network device.

Optionally, the SI request message is for requesting the access network device to transmit the SIB Y, Y being an integer greater than 1.

Optionally, the SIB Y includes the configuration information.

Optionally, the SI request message may be carried in an msg1 or msg3 in a random access process.

For example, when the SI request message is carried in the msg1 in the random access process, the access network device broadcasts a correspondence between a random access code and other SI, a UE, in the msg1 in the random access process, transmits a random access code corresponding to a requested SIB, the access network device learns the SIB requested by the UE, and the random access code transmitted by the UE may be equivalently implemented as the foregoing SI request message; and when the SI request message is carried in the msg3 in the access process, the UE carries the SI request message in the msg3 transmitted to the access network device for transmission, and explicitly indicates the SIB requested by the UE in the SI request message.

Step 502: The terminal receives other SI broadcasted by the access network device.

Optionally, for the configuration information, 5G NR may introduce a new SIB Y, that is, the foregoing SIB Y, and add the configuration information to the SIB Y; alternatively, the 5G NR may add a new field to an existing SIB, the configuration information being carried by using the new field.

Optionally, the access network device obtains the configuration information of the 5G LAN from a core network first, and carries the configuration information through the SIB Y for broadcast.

When a to-be-camped-on cell of the terminal supports n 5G LANs, the configuration information includes a configuration information list. The configuration information list includes n pieces of data. An $i^{th}$ piece of data includes a LAN identifier of an $i^{th}$ 5G LAN and configuration information of the $i^{th}$ 5G LAN, n being a positive integer, 1≤i≤n.

For example, description is made by using an example in which the configuration information includes an information item for indicating whether the 5G LAN supports session continuity, and the configuration information is information carried in the SIB Y. As shown in FIG. 6, system information is classified into minimum SI and other SI. The minimum SI includes a MIB and a SIB 1, and the other SI includes all other remaining SIBs. As shown in FIG. 6, the other SI includes a SIB 2 to the SIB Y. The SIB Y includes a LAN 1, a LAN 2, and a LAN 3 supported by a current to-be-camped-on cell of the terminal. A first line in a list is configuration information of the LAN 1, a second line is configuration information of the LAN 2, and a third line is configuration information of the LAN 3. The LAN 1 and the LAN 2 support session continuity. The LAN 3 does not support session continuity. The LAN 1 is associated with a PLMN A. The LAN 2 is associated with a PLMN B.

Optionally, in the configuration information list, when supporting session continuity with a PLMN, the 5G LAN may be associated with a PLMN. When not supporting the session continuity with a PLMN, the 5G LAN may be associated with no PLMN. Optionally, when the 5G LAN is associated with a PLMN, the 5G LAN may be associated with one PLMN or a plurality of PLMNs. This is not limited in this embodiment of this application.

In summary, in the method for obtaining configuration information provided in this embodiment, before accessing the 5G LAN, the terminal obtains the configuration information of the 5G LAN first. The configuration information includes an information item for assisting the terminal in making an access decision. The terminal determines, according to the configuration information, whether to access the 5G LAN. That is, before accessing the 5G LAN, the terminal obtains the configuration information first, and determines, according to the configuration information, whether to access the 5G LAN, to avoid a problem that the terminal, after accessing the 5G LAN, needs to disconnect and reconnect to a new 5G LAN because the 5G LAN does not meet the configuration requirement (for example: the 5G LAN does not support session continuity), reduce a probability that the terminal reconnects to the new 5G LAN, avoid a waste of network resources when the terminal reconnects to the new 5G LAN, and improve the access efficiency with which the terminal accesses the 5G LAN.

In the method provided in this embodiment, before accessing the 5G LAN, the terminal transmits a SI request message to the access network device first. The access network device transmits configuration information to the terminal by using the SIB Y in the other SI. The configuration information includes an information item for assisting the terminal in making an access decision. The terminal determines, according to the configuration information, whether to access the 5G LAN, to avoid a problem that the terminal, after accessing the 5G LAN, needs to disconnect and reconnect to a new 5G LAN because the 5G LAN does not meet the configuration requirement (for example: the 5G LAN does not support session continuity), reduce a probability that the terminal reconnects to the new 5G LAN, avoid a waste of network resources when the terminal reconnects to the new 5G LAN, and improve the access efficiency with which the terminal accesses the 5G LAN.

FIG. 7 is a flowchart of a method for obtaining configuration information according to another exemplary embodiment of this application. Description is made by using an example in which the method is performed in another RRC signaling manner. Based on the embodiment shown in FIG. 4, step 401 may be further implemented as step 701 and step 702 shown in FIG. 7 instead. As shown in FIG. 7, the method includes the following step:

Step 701: A terminal transmits an RRC connection message to an access network device.

Optionally, the RRC connection message is for requesting the configuration information of the 5G LAN.

Optionally, before transmitting the RRC connection message to the access network device, the terminal transmits an RRC connection request to the access network device. The RRC connection request is for requesting to establish an RRC connection with the access network device. After establishing an RRC connection (that is, the terminal is in a connected state) with the access network device, the terminal transmits the RRC connection message to the access network device.

Step 702: The terminal receives an RRC dedicated signaling transmitted by the access network device.

Optionally, the RRC dedicated signaling includes the configuration information. Optionally, the access network device obtains the configuration information of the 5G LAN from a core network first, carries the configuration information in the SI broadcast, and broadcasts the SI broadcast.

In summary, in the method for obtaining configuration information provided in this embodiment, before accessing the 5G LAN, the terminal obtains the configuration information of the 5G LAN first. The configuration information includes an information item for assisting the terminal in making an access decision. The terminal determines, according to the configuration information, whether to access the 5G LAN. That is, before accessing the 5G LAN, the terminal obtains the configuration information first, and determines, according to the configuration information, whether to access the 5G LAN, to avoid a problem that the terminal, after accessing the 5G LAN, needs to disconnect and reconnect to a new 5G LAN because the 5G LAN does not meet the configuration requirement (for example: the 5G LAN does not support session continuity), reduce a probability that the terminal reconnects to the new 5G LAN, avoid a waste of network resources when the terminal reconnects to the new 5G LAN, and improve the access efficiency with which the terminal accesses the 5G LAN.

In the method provided in this embodiment, before accessing the 5G LAN, the terminal transmits the RRC connection message to the access network device first, and requests, through the RRC connection message, the access network device to transmit the configuration information of the 5G LAN. The access network device transmits the configuration information to the terminal through the RRC dedicated signaling. The terminal determines, according to the configuration information, whether to access the 5G LAN, and uses the RRC dedicated signaling as a transmission carrier of the configuration information. Before the terminal accesses the 5G LAN, the configuration information is transmitted to the terminal through the RRC dedicated signaling, to avoid a waste of network resources when the terminal reconnects to the new 5G LAN, and improve the access efficiency with which the terminal accesses the 5G LAN.

FIG. 4 to FIG. 7 relate to three types of RRC signaling manners. One of the three types of RRC signaling manners may be selected according to a selection condition and implemented in an embodiment shown in FIG. 8. FIG. 8 is a flowchart of a method for obtaining configuration information according to another exemplary embodiment of this application. As shown in FIG. 8, the method includes the following steps:

Step 801: An access network device obtains configuration information of a 5G LAN from a core network.

Optionally, the access network device obtains the configuration information of the 5G LAN from a network element of the core network. Optionally, a network element from which the access network device obtains the configuration information is not limited in this embodiment of this application.

Step 802: Determining whether to use a default broadcast manner.

Optionally, the default broadcast manner is that the access network device may broadcast the SI broadcast to the terminal without receiving any request transmitted by the terminal.

Step 803: The access network device transmits the SI broadcast in a case that the default broadcast manner is used.

Optionally, when the SI broadcast is a broadcast transmitted by the access network device by default, that is, the access network device uses the default broadcast manner, the SI broadcast is broadcasted in the form of minimum SI, the minimum SI including the SIB 1, the SIB 1 including the configuration information.

Step 804: The access network device receives a request transmitted by the terminal and transmits the configuration information through the RRC dedicated signaling or the SIB Y in a case that the default broadcast manner is not used.

Optionally, the access network device, when not using the default broadcast manner, transmits the configuration information to the terminal through the RRC dedicated signaling or the SIB Y.

Optionally, for the embodiments in FIG. 4 to FIG. 7, step 803 corresponds to the embodiment in FIG. 4. That the configuration information is transmitted through an RRC dedicated signaling corresponds to the embodiment in FIG. 7. In this case, a request transmitted by the terminal is an RRC connection message. That the configuration information is transmitted through a SI broadcast corresponds to the embodiment in FIG. 5. In this case, a request transmitted by the terminal is a SI request message.

Then, description is made for the NAS signaling manner. FIG. 9 shows a manner of transmitting an NAS signaling by an access network device according to a received attach request. FIG. 10 shows a manner of transmitting an NAS signaling by the access network device according to a received tracking area update (TAU) request.

FIG. 9 is a flowchart of a method for obtaining configuration information according to an exemplary embodiment of this application. Description is made by using an example in which the method is performed in an NAS signaling manner. The method may be performed by the mobile communication system shown in FIG. 1. As shown in FIG. 9, the method includes the following steps.

Step 901: A terminal transmits an attach request to an access network device.

Optionally, the attach request instructs to obtain configuration information in an explicit indication manner or an implicit indication manner.

Optionally, when instructing to obtain configuration information in the explicit indication manner, the attach request includes at least one flag bit for storing an information obtaining indication. The information obtaining indication is for requesting to obtain the configuration information. When instructing to obtain configuration information in the implicit indication manner, the attach request includes an identifier of a 5G LAN. The identifier of the 5G LAN is for implicitly instructing to obtain configuration information.

Description is made by using the identifier of the 5G LAN as an example in the implicit indication manner in this embodiment. In an actual operation, the implicit indication may alternatively be performed by using another flag bit.

Step 902: The terminal receives a first NAS signaling transmitted by the access network device.

Optionally, the first NAS signaling is a response message of a first network element in a core network to the attach request.

Optionally, after the terminal transmits the attach request to the access network device, the access network device transmits the attach request to the core network. The first network element of the core network transmits, according to the attach request, the first NAS signaling as a response message to the terminal by using the access network device.

Step 903: The terminal determines whether to access the 5G LAN according to the configuration information.

Optionally, the terminal matches the configuration information with a configuration requirement of a current service, and determines, according to the matching result of the configuration information and the configuration requirement, whether the terminal accesses the 5G LAN.

Optionally, the configuration information includes an information item for making an access decision. The configuration requirement further includes a current information item requirement corresponding to the information item. The terminal matches each information item with an information item requirement, and determines, according to a matching result of the information item and the information item requirement, whether to access the 5G LAN. Optionally, each information item corresponds to an information item requirement. Whether to access the 5G LAN is determined according to a matching result of all the information items and the information item requirements.

For example, if the information item included in the configuration information is a first information item, the terminal matches session continuity of the 5G LAN with a session continuity requirement of the current service, and determines, according to a matching result of the session continuity and the session continuity requirement, whether to access the 5G LAN. For example, if the 5G LAN does not support the session continuity, but the session continuity requirement of the current service of the terminal is that the 5G LAN supports the session continuity, the terminal does not access the 5G LAN.

For example, if the information items included in the configuration information are the first information item and the second information item, an information item requirement corresponding to the first information item is the session continuity requirement, and an information item requirement corresponding to the second information item is an SLA requirement, the terminal matches the session continuity of the 5G LAN with the session continuity requirement, and matches the SLA of the 5G LAN with the SLA requirement. When the session continuity of the 5G LAN meets the session continuity requirement or/and the SLA of the 5G LAN meets the SLA requirement, the terminal accesses the 5G LAN.

For example, if one information item is included in the configuration information, the terminal accesses the 5G LAN when the information item meets a corresponding information item requirement. If the configuration information includes two information items, the terminal may access the 5G LAN when one of the information items meets a corresponding information item requirement, or the terminal may access the 5G LAN when the two information items both meet corresponding information item requirements. If the configuration information includes three information items, the terminal may access the 5G LAN when one of the information items meets a corresponding information item requirement, or the terminal may access the 5G LAN when two of the information items meet corresponding information item requirements, or the terminal may access the 5G LAN when all the three information items meet corresponding information item requirements. This is not limited in this embodiment of this application.

Optionally, the configuration information in this application further includes a PLMN related to the 5G LAN. The first information item is further for indicating whether the 5G LAN and the associated PLMN support session continuity.

When a to-be-camped-on cell of the terminal supports n 5G LANs, the configuration information includes a configuration information list. The configuration information list includes n pieces of data. An ith piece of data includes configuration information of an ith 5G LAN, n being a positive integer, 1≤i≤n.

In summary, in the method for obtaining configuration information provided in this embodiment, before accessing the 5G LAN, the terminal obtains the configuration information of the 5G LAN first. The configuration information includes an information item for assisting the terminal in making an access decision. The terminal determines, according to the configuration information, whether to access the 5G LAN. That is, before accessing the 5G LAN, the terminal obtains the configuration information first, and determines, according to the configuration information, whether to access the 5G LAN, to avoid a problem that the terminal, after accessing the 5G LAN, needs to disconnect and reconnect to a new 5G LAN because the 5G LAN does not meet the configuration requirement (for example: the 5G LAN does not support session continuity), reduce a probability that the terminal reconnects to the new 5G LAN, avoid a waste of network resources when the terminal reconnects to the new 5G LAN, and improve the access efficiency with which the terminal accesses the 5G LAN.

In the method provided in this embodiment, before accessing the 5G LAN, the terminal transmits an attach request to the first network element of the core network by using the access network device. The access network device transmits the configuration information to the terminal through the first NAS signaling. The terminal determines, according to the configuration information, whether to access the 5G LAN, to avoid a problem that the terminal, after accessing the 5G LAN, needs to disconnect and reconnect to a new 5G LAN because the 5G LAN does not meet the configuration requirement (for example: the 5G LAN does not support session continuity), reduce a probability that the terminal reconnects to the new 5G LAN, avoid a waste of network resources when the terminal reconnects to the new 5G LAN, and improve the access efficiency with which the terminal accesses the 5G LAN.

FIG. 10 is a flowchart of a method for obtaining configuration information according to another exemplary embodiment of this application. Description is made by using an example in which the method is performed in another NAS signaling manner. Based on the embodiment shown in FIG. 9, step 901 and step 902 may be implemented as step 1001 and step 1002 shown in FIG. 10 instead. The method includes the following steps:

Step 1001: A terminal transmits a TAU request to an access network device.

Optionally, the TAU request is a request transmitted to the access network device when a position of the terminal in a current to-be-camped-on cell changes. Optionally, this step may alternatively be implemented as follows: the access network device actively initiates TAU. When the position of the terminal in the cell changes, the access network device transmits a second NAS signaling to the terminal after the access network device finds, through tracking, that the position of the terminal changes.

Optionally, the TAU request instructs to obtain configuration information in an explicit indication manner or an implicit indication manner.

Optionally, when instructing to obtain configuration information in the explicit indication manner, the TAU request includes at least one flag bit for storing an information obtaining indication. The information obtaining indication is for requesting to obtain the configuration information. When instructing to obtain configuration information in the implicit indication manner, the TAU request includes an identifier of a 5G LAN. The identifier of the 5G LAN is for implicitly instructing to obtain configuration information.

Description is made by using the identifier of the 5G LAN as an example in the implicit indication manner in this embodiment. In an actual operation, the implicit indication may alternatively be performed by using another flag bit or in another manner.

Step 1002: The terminal receives a second NAS signaling transmitted by the access network device.

Optionally, the second NAS signaling is a response message of a second network element in a core network to the TAU request.

Optionally, after the terminal transmits the TAU request to the access network device, the access network device transmits the TAU request to the core network. The second network element of the core network transmits, according to the TAU request, the second NAS signaling as a response message to the terminal by using the access network device.

For example, the terminal buffers a registration state of a TA list granularity in the second network element of the core network. When the position of the terminal in the cell changes, the terminal moves to another TA list. In this case, the terminal needs to update the buffered TA list in the second network element through a TAU process. In the TAU process, the terminal transmits a TAU request to the second network element by using the access network device. After receiving the TAU request transmitted by the terminal, the second network element transmits a response message to the terminal in the form of the second NAS signaling, the second NAS signaling including the configuration information of the 5G LAN.

In summary, in the method for obtaining configuration information provided in this embodiment, before accessing the 5G LAN, the terminal obtains the configuration information of the 5G LAN first. The configuration information includes an information item for assisting the terminal in making an access decision. The terminal determines, according to the configuration information, whether to access the 5G LAN. That is, before accessing the 5G LAN, the terminal obtains the configuration information first, and determines, according to the configuration information, whether to access the 5G LAN, to avoid a problem that the terminal, after accessing the 5G LAN, needs to disconnect and reconnect to a new 5G LAN because the 5G LAN does not meet the configuration requirement (for example: the 5G LAN does not support session continuity), reduce a probability that the terminal reconnects to the new 5G LAN, avoid a waste of network resources when the terminal reconnects to the new 5G LAN, and improve the access efficiency with which the terminal accesses the 5G LAN.

In the method provided in this embodiment, before accessing the 5G LAN, the terminal transmits the TAU request to the second network element of the core network by using the access network device because the position changes. The second network element responds, by using the access network device, to the terminal with the second NAS signaling, the second NAS signaling including the configuration information of the 5G LAN. The terminal determines, according to the configuration information, whether to access the 5G LAN, to avoid a problem that the terminal, after accessing the 5G LAN, needs to disconnect and reconnect to a new 5G LAN because the 5G LAN does not meet the configuration requirement (for example: the 5G LAN does not support session continuity), reduce a probability that the terminal reconnects to the new 5G LAN, avoid a waste of network resources when the terminal reconnects to the new 5G LAN, and improve the access efficiency with which the terminal accesses the 5G LAN.

Figure 11:
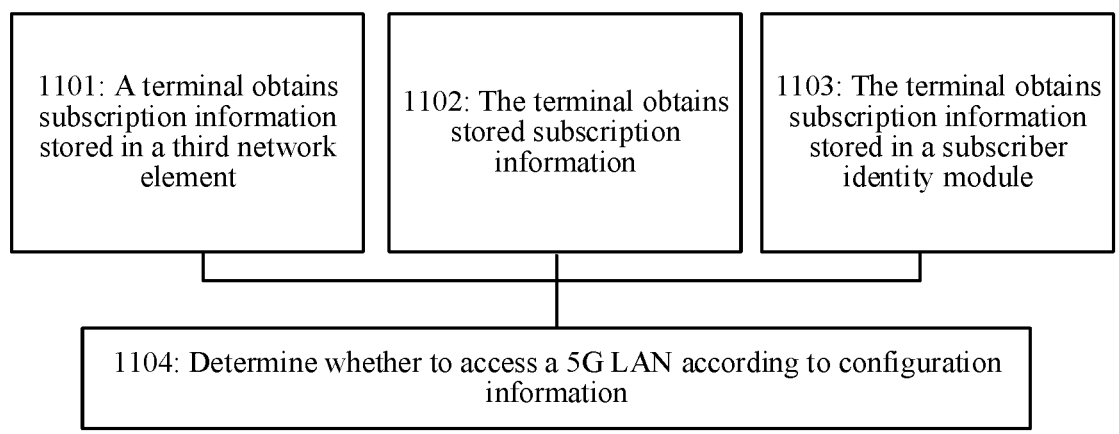
FIG. 11 is a flowchart of a method for obtaining configuration information according to another exemplary embodiment of this application.

In addition, description is made for the subscription information manner. FIG. 11 is a flowchart of a method for obtaining configuration information according to an exemplary embodiment of this application. Description is made by using an example in which the method is performed in the subscription information manner. The method may be performed by the mobile communication system shown in FIG. 1. As shown in FIG. 11, the method includes the following steps.

Step 1101: A terminal obtains subscription information stored in a third network element.

Optionally, the terminal obtains, by using an access network device, the subscription information stored in the third network element. Optionally, the subscription information includes the configuration information.

Optionally, the subscription information is stored in a network element, namely, a policy control function (PCF).

Step 1102: The terminal obtains subscription information stored in the terminal.

Optionally, the terminal stores the subscription information, the subscription information including the configuration information.

Step 1103: The terminal obtains subscription information stored in a SIM.

Optionally, the SIM card of the terminal stores the subscription information, the subscription information including the configuration information.

One of step 1101, step 1102, and step 1103 may be selected and performed.

Step 1104: The terminal determines, according to the configuration information, whether to access the 5G LAN.

The manner of determining, according to the configuration information, whether to access the 5G LAN is described in detail in step 202. Details are not described herein again.

In summary, in the method for obtaining configuration information provided in this embodiment, before accessing the 5G LAN, the terminal obtains the configuration information of the 5G LAN first. The configuration information includes an information item for assisting the terminal in making an access decision. The terminal determines, according to the configuration information, whether to access the 5G LAN. That is, before accessing the 5G LAN, the terminal obtains the configuration information first, and determines, according to the configuration information, whether to access the 5G LAN, to avoid a problem that the terminal, after accessing the 5G LAN, needs to disconnect and reconnect to a new 5G LAN because the 5G LAN does not meet the configuration requirement (for example: the 5G LAN does not support session continuity), reduce a probability that the terminal reconnects to the new 5G LAN, avoid a waste of network resources when the terminal reconnects to the new 5G LAN, and improve the access efficiency with which the terminal accesses the 5G LAN.

In the method provided in this embodiment, the configuration information of the 5G LAN is obtained by obtaining the subscription information, to avoid a problem that the terminal, after accessing the 5G LAN, needs to disconnect and reconnect to a new 5G LAN because the 5G LAN does not meet the configuration requirement (for example: the 5G LAN does not support session continuity).

Figure 12:
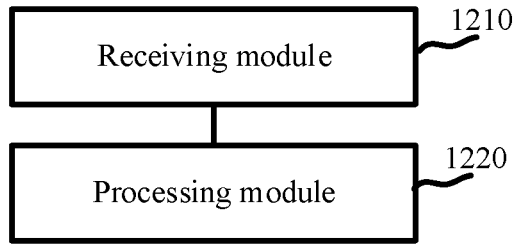
FIG. 12 is a structural block diagram of an apparatus for obtaining configuration information according to an exemplary embodiment of this application.

FIG. 12 is a structural block diagram of an apparatus for obtaining configuration information according to an exemplary embodiment of this application. As shown in FIG. 12, the apparatus includes a receiving module 1210 and a processing module 1220.

The receiving module 1210 is configured to obtain configuration information of a 5G LAN, the configuration information including an information item for assisting the terminal in making an access decision.

The processing module 1220 is configured to determine, according to the configuration information, whether to access the 5G LAN.

In an optional embodiment, the configuration information includes at least one of the following information items: a first information item, for indicating whether the 5G LAN supports maintenance of session continuity with a PLMN; a second information item, for indicating an identifier of the 5G LAN; and a third information item, for indicating an SLA of the 5G LAN.

In an optional embodiment, the receiving module 1210 is further configured to receive the configuration information transmitted by an access network device in an RRC signaling manner.

In an optional embodiment, the receiving module 1210 is further configured to receive a SI broadcast transmitted by the access network device, the SI broadcast including the configuration information.

Figure 13:
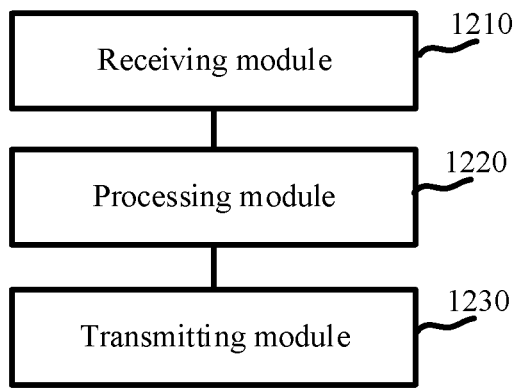
FIG. 13 is a structural block diagram of an apparatus for obtaining configuration information according to another exemplary embodiment of this application.

As shown in FIG. 13, in an optional embodiment, the apparatus further includes:

a transmitting module 1230, configured to transmit a SI request message to the access network device, the SI request message being for requesting the access network device to transmit a SIB Y, Y being an integer greater than 1.

The receiving module 1210 is further configured to receive other SI broadcasted by the access network device, the other SI including the SIB Y, the SIB Y including the configuration information.

In an optional embodiment, the transmitting module 1230 is configured to transmit an RRC connection message to the access network device, the RRC connection message being for requesting the configuration information.

The receiving module 1210 is further configured to receive an RRC dedicated signaling transmitted by the access network device, the RRC dedicated signaling including the configuration information.

In an optional embodiment, the receiving module 1210 is further configured to receive an NAS signaling transmitted by the access network device, the NAS signaling including the configuration information.

In an optional embodiment, the transmitting module 1230 is configured to transmit an attach request to the access network device.

The receiving module 1210 is further configured to receive a first NAS signaling transmitted by the access network device. The first NAS signaling is a response message of a first network element in a core network to the attach request.

In an optional embodiment, the transmitting module 1230 is configured to transmit a TAU request to the access network device.

The receiving module 1210 is further configured to receive a second NAS signaling transmitted by the access network device. The second NAS signaling is a response message of a second network element in the core network to the TAU request.

In an optional embodiment, the attach request instructs to obtain configuration information in an explicit indication manner or an implicit indication manner.

In an optional embodiment, when the attach request instructs to obtain the configuration information in the explicit indication manner, the attach request includes at least one flag bit for storing an information obtaining indication. The information obtaining indication is for requesting to obtain the configuration information.

When the attach request instructs to obtain the configuration information in the implicit indication manner, the attach request includes an identifier of a 5G LAN. The identifier of the 5G LAN is for implicitly instructing to obtain the configuration information.

In an optional embodiment, the TAU request instructs to obtain configuration information in an explicit indication manner or an implicit indication manner.

In an optional embodiment, when the TAU request instructs to obtain the configuration information in the explicit indication manner, the TAU request includes at least one flag bit for storing an information obtaining indication. The information obtaining indication is for requesting to obtain the configuration information.

When the TAU request instructs to obtain the configuration information in the implicit indication manner, the TAU request includes an identifier of a 5G LAN. The identifier of the 5G LAN is for implicitly instructing to obtain the configuration information.

In an optional embodiment, the receiving module 1210 is further configured to obtain subscription information stored in a third network element of a core network, the subscription information comprising the configuration information; or, the receiving module 1210 is further configured to obtain subscription information in the terminal, the subscription information including the configuration information;

or, the receiving module 1210 is further configured to obtain subscription information stored in a SIM, the subscription information including the configuration information.

In an optional embodiment, the processing module 1220 is further configured to match the configuration information with a configuration requirement of a current service, and determine, according to a matching result of the configuration information and the configuration requirement, whether to access the 5G LAN.

In an optional embodiment, the processing module 1220 is further configured to match information items with current information item requirements corresponding to the information items, and determine, according to a matching result of each of the information items and an information item requirement, whether to access the 5G LAN.

In an optional embodiment, the configuration information further includes a PLMN associated with the 5G LAN. The first information item is further for indicating whether the 5G LAN and the PLMN associated with the 5G LAN support session continuity.

In an optional embodiment, when a to-be-camped-on cell of the terminal supports n 5G LANs, the configuration information includes a configuration information list. The configuration information list includes n pieces of data. An ith piece of data includes configuration information of an ith 5G LAN, n being a positive integer, $1 \leq i \leq n$.

The transmitting module in the foregoing embodiment may be implemented by using a communication chip, or may be implemented by using a communication chip and a processor in cooperation; and/or, the receiving module in the foregoing embodiment may be implemented by using a communication chip, or may be implemented by using a communication chip and a processor in cooperation.

Figure 14:
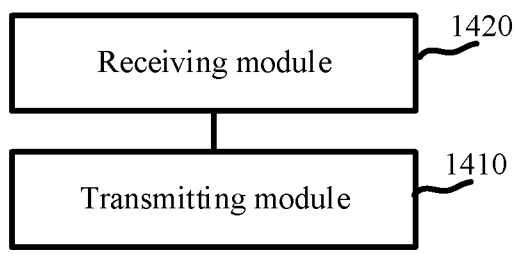
FIG. 14 is a structural block diagram of an apparatus for obtaining configuration information according to an exemplary embodiment of this application.

As shown in FIG. 14, an embodiment of this application further provides an apparatus for obtaining configuration information. The apparatus includes:

a transmitting module 1410, configured to transmit configuration information of a 5G LAN to a terminal, the configuration information including an information item for assisting the terminal in making an access decision.

In an optional embodiment, the configuration information includes at least one of the following information items:

a first information item, for indicating whether the 5G LAN supports maintenance of session continuity with a PLMN; a second information item, for indicating an identifier of the 5G LAN; and a third information item, for indicating an SLA of the 5G LAN.

In an optional embodiment, the transmitting module 1410 is further configured to transmit the configuration information to the terminal in an RRC signaling manner.

In an optional embodiment, the transmitting module 1410 is further configured to transmit a SI broadcast, the SI broadcast including the configuration information.

In an optional embodiment, the apparatus further includes:

a receiving module 1420, configured to receive a SI request message transmitted by the terminal, the SI request message being for requesting the access network device to transmit a SIB Y, Y being an integer greater than 1; and the transmitting module 1410 is further configured to broadcast other SI, the other SI including the SIB Y, the SIB Y including the configuration information.

In an optional embodiment, the receiving module 1420 is configured to receive an RRC connection message transmitted by the terminal, the RRC connection message being for requesting the configuration information.

The transmitting module 1410 is further configured to transmit an RRC dedicated signaling to the terminal, the RRC dedicated signaling including the configuration information.

In an optional embodiment, the transmitting module 1410 is further configured to transmit an NAS signaling to the terminal, the NAS signaling including the configuration information.

In an optional embodiment, the receiving module 1420 is configured to receive an attach request transmitted by the terminal.

The transmitting module 1410 is further configured to transmit a first NAS signaling to the terminal. The first NAS signaling is a response message of a first network element in a core network to the attach request.

In an optional embodiment, the receiving module 1420 is configured to receive a TAU request transmitted by the terminal.

The transmitting module 1410 is further configured to transmit a second NAS signaling to the terminal. The second NAS signaling is a response message of a second network element in a core network to the TAU request.

In an optional embodiment, the attach request instructs to obtain configuration information in an explicit indication manner or an implicit indication manner.

In an optional embodiment, when the attach request instructs to obtain the configuration information in the explicit indication manner, the attach request includes at least one flag bit for storing an information obtaining indication. The information obtaining indication is for requesting to obtain the configuration information.

When the attach request instructs to obtain the configuration information in the implicit indication manner, the attach request includes an identifier of a 5G LAN. The identifier of the 5G LAN is for implicitly instructing to obtain the configuration information.

In an optional embodiment, the TAU request instructs to obtain configuration information in an explicit indication manner or an implicit indication manner.

In an optional embodiment, when the TAU request instructs to obtain the configuration information in the explicit indication manner, the TAU request includes at least one flag bit for storing an information obtaining indication. The information obtaining indication is for requesting to obtain the configuration information.

When the TAU request instructs to obtain the configuration information in the implicit indication manner, the TAU request includes an identifier of a 5G LAN. The identifier of the 5G LAN is for implicitly instructing to obtain the configuration information.

In an optional embodiment, the transmitting module 1410 is further configured to transmit subscription information stored in a third network element of a core network to the terminal, the subscription information including the configuration information.

In an optional embodiment, the terminal is further configured to match the configuration information with a configuration requirement of a current service, and determine, according to a matching result of the configuration information and the configuration requirement, whether to access the 5G LAN.

In an optional embodiment, the terminal is further configured to match a service attribute with an attribute requirement of a current service, and determine, according to a matching result of the service attribute and the service attribute requirement, whether to access the 5G LAN.

In an optional embodiment, the configuration information further includes a PLMN associated with the 5G LAN.

The first information item is further for indicating whether the 5G LAN and the PLMN associated with the 5G LAN support session continuity.

In an optional embodiment, when a to-be-camped-on cell of the terminal supports n 5G LANs, the configuration information includes a configuration information list. The configuration information list includes n pieces of data. An ith piece of data includes configuration information of an ith 5G LAN, n being a positive integer, $1 \leq i \leq n$.

The transmitting module in the foregoing embodiment may be implemented by using a communication chip, or may be implemented by using a communication chip and a processor in cooperation; and/or, the receiving module in the foregoing embodiment may be implemented by using a communication chip, or may be implemented by using a communication chip and a processor in cooperation.

Figure 15:
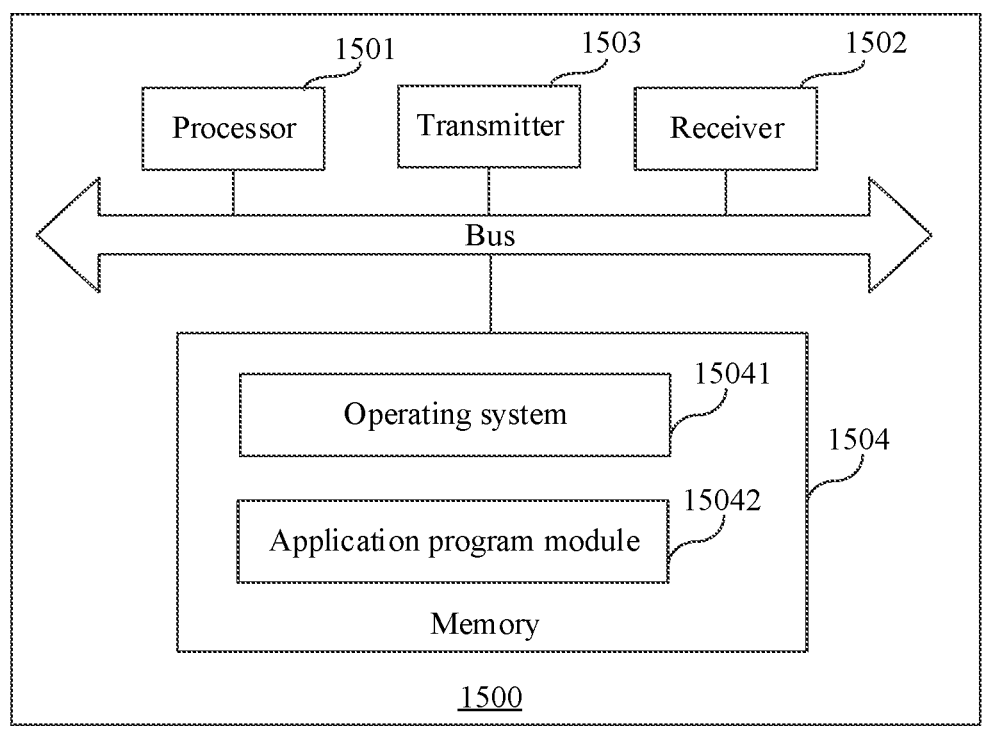
FIG. 15 is a structural block diagram of a terminal according to an exemplary embodiment of this application.

FIG. 15 is a block diagram of a device 1500 for obtaining configuration information according to an exemplary embodiment. For example, the device 1500 may be a terminal or an access network device. As shown in FIG. 15, the device 1500 may include a processor 1501, a receiver 1502, a transmitter 1503, and a memory 1504. The receiver 1502, the transmitter 1503, and the memory 1504 are respectively connected to the processor 1501 through a bus.

The processor 1501 includes one or more processing cores, and the processor 1501 performs the method performed by the terminal or the access network device in the method for obtaining configuration information according to the embodiments of the present disclosure by running a software program and a module. The memory 1504 may be configured to store a software program and a module. Specifically, the memory 1504 may store an operating system 15041 and an application program module 15042 needed by at least one function. The receiver 1502 is configured to receive communication data transmitted by other devices. The transmitter 1503 is configured to transmit communication data to other devices.

In an exemplary embodiment, a computer-readable storage medium is further provided. The computer-readable storage medium is a non-volatile computer-readable storage medium. The computer-readable storage medium stores a computer-readable instruction. The stored computer-readable instruction, when executed by a processing component, may implement the method for obtaining configuration information provided in the foregoing embodiment of the present disclosure. For example, configuration information of a 5G LAN may be obtained, the configuration information including an information item for assisting the terminal in making an access decision, and whether a terminal accesses the 5G LAN is determined according to the configuration information.

An embodiment of the present disclosure further provides a computer program product storing an instruction, the instruction, when run on a computer, causing the computer to perform the method for obtaining configuration information provided in the embodiments of the present disclosure.

An embodiment of the present disclosure further provides a chip including at least one of a programmable logic circuit or a program instruction. When the chip is running, the method for obtaining configuration information provided in the embodiments of the present disclosure may be performed.

It is to be understood that the steps in the embodiments of this application are not necessarily performed sequentially in the order indicated by the step labels. Unless explicitly specified in this application, the sequence of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some of sub-steps or stages of other steps.

A person of ordinary skill in the art may understand that all or some of the processes in the method of the foregoing embodiments may be implemented and completed by using the computer programs to instruct related hardware. The programs may be stored in a non-volatile computer-readable storage medium, and the programs, when executed, may include the processes of the foregoing method embodiments. Any reference to the memory, storage, a database, or other media used in the embodiments provided in this application may include a non-volatile and/or volatile memory. The non-volatile memory may include a read only memory (ROM), a programmable ROM (PROM), an electrically programmable ROM (EPROM), an electrically erasable programmable ROM (EEPROM) or a flash memory. The volatile memory may include a RAM or an external high-speed cache memory. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (synchlink) DRAM (SLDRAIVI), a Rambus direct RAM (RDRAM), a direct Rambus dynamic RAM (DRDRAM), and a Rambus dynamic RAM (RDRAM).

It is to be understood that "a plurality of" described in this specification refers to two or more. "And/or" describes an association relationship for describing associated objects and represents that three relationships may exist. For example, A and/or B may represent the following three cases: only A exists, both A and B exist, and only B exists. The character "/" in this specification generally indicates an "or" relationship between the associated objects.

After considering the specification and practicing the present disclosure, a person skilled in the technology would easily conceive of other implementations of the present disclosure. This application is intended to cover any variation, use, or adaptive change of the present disclosure. The variations, uses, or adaptive changes follow the general principles of the present disclosure and include common general knowledge or common technical means, which are not disclosed in the present disclosure, in the technology.

The specification and the embodiments are considered as merely exemplary, and the real scope and spirit of the present disclosure are pointed out in the following claims. It is to be understood that the present disclosure is not limited to the accurate structures that are described above and that are shown in the accompanying drawings, and modifications and changes may be made without departing from the scope of the disclosure. The scope of the present disclosure is subject only to the appended claims.

What is claimed is:

1. A method for obtaining configuration information, performed by a terminal, the method comprising:
receiving, by the terminal, configuration information of a 5G local area network (LAN) transmitted by an access network device in a Radio Resource Control (RRC) signaling manner, the configuration information comprising an information item for assisting the terminal in making an access decision and at least one of the following information items:
a first information item, for indicating whether the 5G LAN supports maintenance of session continuity with a public land mobile network (PLMN);
a second information item, for indicating an identifier of the 5G LAN; and
a third information item, for indicating a service-level agreement (SLA) of the 5G LAN, the receiving, by the terminal, the configuration information further comprising:
transmitting, by the terminal, a SI request message to the access network device, the SI request message being for requesting the access network device to transmit a SI block (SIB) Y, Y being an integer greater than 1; and
receiving, by the terminal, other SI broadcasted by the access network device, the other SI comprising the SIB Y, the SIB Y comprising the configuration information; and
determining, by the terminal, whether to access the 5G LAN according to the configuration information.

2. The method according to claim 1, wherein the receiving, by the terminal, the configuration information comprises:
receiving, by the terminal, a system information (SI) broadcast transmitted by the access network device, the SI broadcast comprising the configuration information.

3. The method according to claim 1, wherein the receiving, by the terminal, the configuration information comprises:
transmitting, by the terminal, an RRC connection message to the access network device, the RRC connection message being for requesting the configuration information; and
receiving, by the terminal, an RRC dedicated signaling transmitted by the access network device, the RRC dedicated signaling comprising the configuration information.

4. The method according to claim 1, wherein the receiving, by the terminal, configuration information of a 5G LAN comprises:
receiving, by the terminal, a non-access stratum (NAS) signaling transmitted by the access network device, the NAS signaling comprising the configuration information.

5. The method according to claim 1, wherein the receiving, by the terminal, configuration information of a 5G LAN comprises:
obtaining, by the terminal, subscription information stored in a third network element of a core network, the subscription information comprising the configuration information.

6. The method according to claim 1, wherein the receiving, by the terminal, configuration information of a 5G LAN comprises:
obtaining, by the terminal, subscription information in the terminal, the subscription information comprising the configuration information.

7. The method according to claim 1, wherein the receiving, by the terminal, configuration information of a 5G LAN comprises:
obtaining, by the terminal, subscription information stored in a subscriber identity module (SIM), the subscription information comprising the configuration information.

8. A terminal, comprising:
a processor;
a transceiver connected to the processor; and
a memory, configured to processor-executable instructions, wherein the processor-executable instructions, when executed by the processor, cause the terminal to perform:
receiving configuration information of a 5G local area network (LAN) transmitted by an access network device in a Radio Resource Control (RRC) signaling manner, the configuration information comprising an information item for assisting the terminal in making an access decision and at least one of the following information items:
a first information item, for indicating whether the 5G LAN supports maintenance of session continuity with a public land mobile network (PLMN);
a second information item, for indicating an identifier of the 5G LAN; and
a third information item, for indicating a service-level agreement (SLA) of the 5G LAN, the receiving the configuration information further comprising:
transmitting a SI request message to the access network device, the SI request message being for requesting the access network device to transmit a SI block (SIB) Y, Y being an integer greater than 1; and
receiving other SI broadcasted by the access network device, the other SI comprising the SIB Y, the SIB Y comprising the configuration information; and
determining whether to access the 5G LAN according to the configuration information.

9. The terminal according to claim 8, wherein the receiving the configuration information transmitted by an access network device in an RRC signaling manner comprises:
receiving a system information (SI) broadcast transmitted by the access network device, the SI broadcast comprising the configuration information.

10. The terminal according to claim 8, wherein the receiving the configuration information comprises:
transmitting an RRC connection message to the access network device, the RRC connection message being for requesting the configuration information; and
receiving an RRC dedicated signaling transmitted by the access network device, the RRC dedicated signaling comprising the configuration information.

11. The terminal according to claim 8, wherein the receiving configuration information of a 5G LAN comprises:

receiving a non-access stratum (NAS) signaling transmitted by the access network device, the NAS signaling comprising the configuration information.

12. The terminal according to claim 8, wherein the receiving configuration information of a 5G LAN comprises:
obtaining subscription information stored in a third network element of a core network, the subscription information comprising the configuration information.

13. The terminal according to claim 8, wherein the receiving configuration information of a 5G LAN comprises:
obtaining subscription information stored in a subscriber identity module (SIM), the subscription information comprising the configuration information.

14. One or more non-transitory computer-readable storage media storing computer-readable instructions, the computer-readable instructions, when executed by one or more processors of a terminal, causing the terminal to perform:
obtaining receiving configuration information of a 5G local area network (LAN) transmitted by an access network device in a Radio Resource Control (RRC) signaling manner, the configuration information comprising an information item for assisting the terminal in making an access decision and at least one of the following information items:
a first information item, for indicating whether the 5G LAN supports maintenance of session continuity with a public land mobile network (PLMN);
a second information item, for indicating an identifier of the 5G LAN; and
a third information item, for indicating a service-level agreement (SLA) of the 5G LAN, the receiving the configuration information further comprising:
transmitting a SI request message to the access network device, the SI request message being for requesting the access network device to transmit a SI block (SIB) Y, Y being an integer greater than 1; and
receiving other SI broadcasted by the access network device, the other SI comprising the SIB Y, the SIB Y comprising the configuration information; and
determining, according to the configuration information, whether the terminal accesses the 5G LAN.

15. The non-transitory computer-readable storage media according to claim 14, wherein the receiving configuration information of a 5G LAN comprises:
receiving a non-access stratum (NAS) signaling transmitted by the access network device, the NAS signaling comprising the configuration information.

16. The non-transitory computer-readable storage media according to claim 14, wherein the receiving configuration information of a 5G LAN comprises:
obtaining subscription information stored in a third network element of a core network, the subscription information comprising the configuration information.

* * * * *